United States Patent [19]

Srail

[11] 3,904,467
[45] Sept. 9, 1975

[54] METHOD OF MAKING CURVED RESILIENT LAMINATES

[75] Inventor: Raymond C. Srail, Parma, Ohio

[73] Assignee: The B. F. Goodrich Company, Akron, Ohio

[22] Filed: Nov. 26, 1973

[21] Appl. No.: 418,903

Related U.S. Application Data

[62] Division of Ser. No. 192,038, Oct. 26, 1971, abandoned.

[52] U.S. Cl. ................ 156/229; 156/306; 156/322; 264/291; 264/DIG. 73; 260/775; 428/492; 428/519; 428/DIG. 910

[51] Int. Cl.² ..................... B29D 7/24; B32B 25/00; B32B 27/00

[58] Field of Search ............ 161/253, 252; 264/288, 264/291, 347, DIG. 73; 156/229, 243, 128, 123, 163, 164, 306, 322, 311, 282; 260/775

[56] References Cited
UNITED STATES PATENTS

| | | | |
|---|---|---|---|
| 2,625,981 | 1/1953 | Wallace | 156/163 |
| 3,416,991 | 12/1968 | Yoshimura | 156/229 |
| 3,522,831 | 8/1970 | Torti et al. | 161/253 |
| 3,616,123 | 10/1971 | Reynolds et al. | 156/229 |

*Primary Examiner*—Charles E. Van Horn
*Assistant Examiner*—Jerome W. Massie
*Attorney, Agent, or Firm*—W. A. Shira, Jr.

[57] ABSTRACT

Curved resilient laminates are made by vulcanizing an elastomer lamina in adhesive contact with a heat formable elastomer lamina. The vulcanized laminate is stretched while hot and cooled while stretched. On release of the tension, the heat formable lamina retains its extension and the other lamina retracts and curves the product.

5 Claims, 7 Drawing Figures

PATENTED SEP 9 1975　　　　　　　　　　　3,904,467

METHOD OF MAKING CURVED RESILIENT LAMINATES

This is a division of application Ser. No. 192,038, filed Oct. 26, 1971, now abandoned.

CROSS REFERENCES TO RELATED APPLICATIONS

Some of the heat formable elastomers which may be used in this invention are the subjects of applications for patent of James Sidles and Raymond C. Srail, Ser. No. 189,026 filed Oct. 13, 1971 and of Gary A. Harpell, Ser. No. 191,118 filed Oct. 20, 1971, now abandoned, and divisional application Ser. No. 374,891 filed Jun. 29, 1973, all assigned to the assignee of this application.

BACKGROUND OF THE INVENTION

It has been known for a long time that articles can be produced in a curved or bent shape by laminating a stretched material to one which is unstretched and then releasing the stress to permit retraction of the stretched component. This has seemed to be an attractively simple way to produce articles which have an elastic resistance to straightening so that they revert to the curved shape when released.

Practical experience has shown that the influences required for bonding the laminae, or for release of stress to permit curvature to result, interfere with retention of the internal forces relied on for curvature, to such an extent that not very much use has been made of this technique for producing curved articles.

SUMMARY OF THE INVENTION

I have found that vulcanized laminates containing a lamina of an ordinary resilient elastomer material and a lamina of a heat formable elastomer are easily made and have unique properties adapting them for a variety of novel uses. In particular, such laminates are easily made into curved articles of many different kinds.

The lamina of ordinary elastomer material may be made from natural rubber or from any of the highly resilient "synthetic rubbers" such as neoprene, silicone rubbers, polyepichlorohydrin, and the like, compounded with vulcanizing agents suitable for the chosen material, and, if desired, with carbon black or other pigments and such further added ingredients as may be appropriate for any particular use.

The heat formable elastomer must be sufficiently compatible with the rubber composition to bond strongly to it during vulcanization. It should contain no different polymeric ingredients, one of which is in minute domains dispersed throughout a matrix composed of the other ingredient. One of the ingredients may be the same kind of elastomer material used in the lamina of ordinary elastomer composition, or may be any other compatible elastomer material which is highly extensible at room temperature or the ordinary temperature of use, as well as higher temperatures. The other ingredient of the heat formable elastomer must be essentially inextensible at room temperature and be thermoplastic. It should preferably be firmly bonded to the elastomer ingredient. There are several ways in which heat formable elastomers may be made.

One kind of heat formable elastomer is simply a known kind of block copolymer having a central elastomer block and terminal thermoplastic blocks, such as polystyrenepolybutadiene-polystyrene block polymers. When the molecular weight of the central elastomer block is about 40,000 to 80,000 and the molecular weight of each terminal thermoplastic block is about 10,000 to 20,000, the material is a thermoplastic elastomer which can be formed to any desired shape at temperatures of about 150° C or higher. At lower temperatures the polystyrene terminal blocks clump into domains joined to neighboring polystyrene domains by many entangled chains of the polybutadiene central block, with the polybutadiene apparently being a continuous phase in which are polystyrene domains as a disperse phase. At room temperature, the material has a high strength and extensibility like vulcanized rubber, even though not chemically vulcanized.

Another kind of heat formable elastomer is the reverse of the foregoing, namely a block copolymer having a central thermoplastic block and terminal elastomer blocks. This kind of material should be vulcanized, either alone or with added elastomer material, and will then tend to revert to its vulcanized size and shape when heated, unless forcibly prevented. It can be altered in shape and dimensions while hot, and after cooling, will retain the altered shape and dimensions until it is reheated.

Still another kind of heat formable elastomer is a physical mixture of a vulcanizable elastomer with another ingredient which is essentially inextensible at room temperature, and is capable of bonding strongly to the first named elastomer during vulcanization. An example is a blend of trans 1,4 polybutadiene, which is nearly inextensible at room temperature, bvut is elastomeric at temperatures over about 100° C, with an equal or greater quantity of vulcanizable rubber composition. After vulcanization, such a blend can be reshaped while hot, within the limits of its extensibility, and will retain the shape as long as it is not reheated.

The laminae of ordinary elastomer material and of heat formable elastomer may be prepared and assembled in any convenient manner, and are vulcanized in contact. For example, calendered sheets of the two constituents may be superimposed and vulcanized by heating. Or they may be extruded in the separate barrels of a pair of screw extruders having a common die, so that the extruded strip will have the two constituents on opposite faces, followed by vulcanization of the composite strip.

The vulcanized laminate is then heated above the glass transition temperature of the inextensible component of the heat formable lamina; that is, it is heated to the temperature of thermoplasticity of that component, which is the temperature at which the heat formable lamina can be reshaped. The laminate is then stretched or otherwise reshaped while hot, and cooled while it is held in the altered shape. Upon release of the deforming force, the rubber lamina contracts and curves the article in a direction and to a degree dependent on the kind and magnitude of the deforming force.

DRAWINGS

In the accompanying drawings, FIG. 1 is a rectangular laminate made in accordance with this invention.

DETAILED DESCRIPTION

Figure 1:
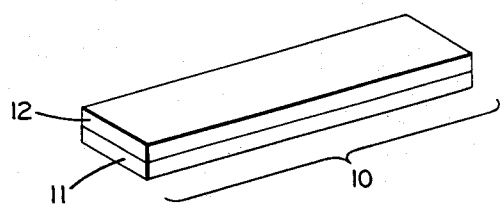

In a preferred embodiment of this invention, a rectangular laminate 10, as shown in FIG. 1, is made as follows. A natural rubber composition is prepared by adding sufficient carbon black to toughen it without significantly diminishing its resiliency, say 30 to 40 parts by weight for each 100 parts of rubber, along with the usual vulcanizing agents, antioxidants, etc. A portion of this is formed into a sheet 11 about 0.04 inch thick. Another portion is mixed with one-half its weight of trans 1,4 polybutadiene and formed into another similar sheet 12. The two sheets are carefully rolled together to avoid entrapment of air and the resulting laminate is heated in a flat mold to vulcanize the rubber and bond the laminae to each other. The vulcanized laminate has a thickness of about 0.07 inch.

Figure 2:
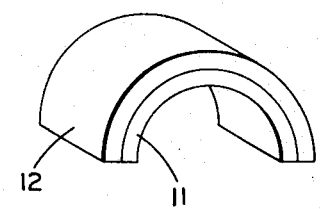
FIG. 2 and FIG. 3 are curved articles made from the laminate of FIG. 1.
Figure 3:
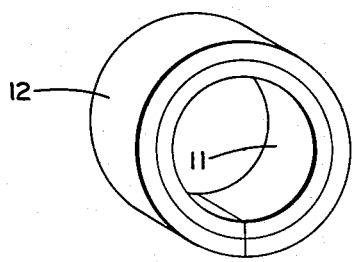

A strip is cut from the vulcanized laminate and is heated to about 100° C until it is heated throughout its thickness. The hot strip is then stretched about 50% of its vulcanized length and held stretched until it is cool. While still stretched, a piece about one-half inch long is cut from the strip. This piece immediately curves to a semicircular or U shape as shown in FIG. 2. Another piece is cut about one inch long, and immediately curves to a circular shape as shown in FIG. 3.

Figure 4:
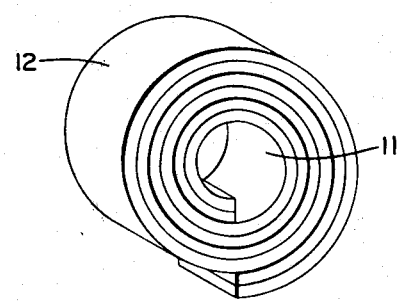
FIG. 4 is a spiral convolution resulting from the curvature of a very long laminate similar to that of FIG. 1.

A long strip is cut from the vulcanized laminate described above, heated at 100° C, and stretched to three times its length, cooled and released. It coils up into a tight spiral roll as shown in FIG. 4.

Figure 5:
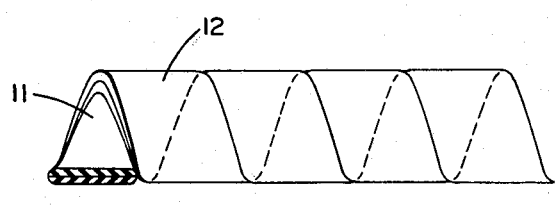
FIG. 5 is a helical tube made from a similar laminate.

If the highly stretched strip just mentioned is relatively narrow, with a width not over abour four times its thickness, it will be difficult to keep its curved convolutions in a flat spiral. Instead, the coils tend to lie alongside one another in a tightly coiled helix of uniform diameter, as shown in FIG. 5. If the strip is also very long, it will tend, when released from its stretched condition, to twist in one direction or the other and to form a pair of tightly coiled helices of opposite hand, starting at both ends, with a transitional loop in the middle, but either or both halves can be recoiled in the opposite hand if that is preferred.

Figure 6:
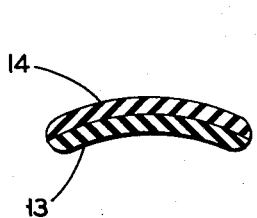
FIG. 6 is a cross section of a laminate which is vulcanized as a transversely curved strip.

The same two compositions mentioned above are extruded through a pair of screw extruders discharging into a common die with an opening forming a rounded and transversely curved strip, with the rubber composition forming about half the thickness 13 of the strip and the heat formable elastomer forming the other half of the thickness 14 on the convex side of the strip, as shown in cross section in FIG. 6. The strip is vulcanized in a long straight length. It is heated to 100° C and stretched to four times it vulcanized length and cooled while stretched. When it is released, it coils into a tight helix with outwardly bowed convolutions s shown in FIG. 7.

The specific materials and proportions recited above can be replaced by other analogous ones. The two layer laminates of distinct compositions can be replaced by laminates of three or more layers of graduated composition. The relative thicknesses and dimensions, as well as the degree of stretch frozen into the heat formable lamina may be altered to suit the purpose for which the products are intended.

In general, the curved resilient laminates of this invention may be used as springs in any situation in which uncoiling or straightening of a curved element is desired. Thus, U shaped elements as in FIG. 2 may be utilized as hinges having a permanent bias toward a closed position. Circular elements as in FIG. 3 may be utilized to hold cylindrical containers with a longitudinal opening in a closed position, while permitting them easily to be forced open.

A spiral coil as in FIG. 4 may be utilized as a spring for producing rotation of a shaft with a progressively changing torsional force, when the innermost end is fastened to the shaft and the outer end is drawn away from or allowed to move toward the axis. A similar action, but with a constant froce, will result if one end of a helix as in FIG. 5 is fastened to a shaft and the other end is drawn away from or allowed to move toward the axis.

Figure 7:
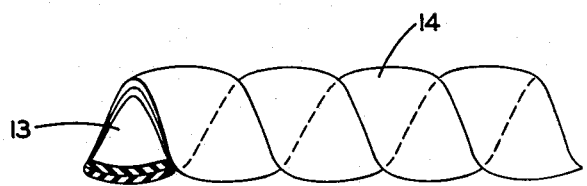
FIG. 7 is a helical tube made from such a strip.

If the two ends of a helix as in FIG. 5 or FIG. 7 are pulled axially away from one another, the helix will act as a solft spring until the convolutions are nearly straightened out, and will then resist further elongation with a rapidly increasing force, and will finally exhibit a modulus of elasticity many times its original modulus. Such elements can be used whenever a restricted but not positively limited extensibility is desired. For example, such helices in pairs of opposite hand and of appropriately small dimensions may be used as wrist watch bands by fastening their ends to opposite sides of a watch.

Helices similar to those shown in FIGS. 5 and 7 are also ideally adapted for protective coverings or wraps for cylindrical articles or for bundles such as electric wiring assemblies.

Innumerable other uses for such curved resilient laminates will be apparent from their unique properties.

I claim:

1. A process for making a curved resilient laminate which comprises vulcanizing a lamina of elastomer in adherent contact with a, lamina of heat formable elastomer, stretching the vulcanized laminate while hot, and cooling it while stretched.

2. A process as in claim 1, in which the heat formable elastomer includes a thermoplastic ingredient and a vulcanizable elastomer ingredient vulcanized simultaneously with the elastomer lamina.

3. A process as in claim 1, with the added step of releasing the laminate when cool.

4. A process as in claim 2, with the added step of releasing the laminate when cool.

5. A process as in claim 4, with the added step of applying a force to the released laminate for biasing it toward its stretched condition.

* * * * *